United States Patent
Vanderet et al.

(10) Patent No.: US 9,239,639 B1
(45) Date of Patent: Jan. 19, 2016

(54) PROTECTING STYLUS FORCE SENSOR FROM EXCESS FORCE

(71) Applicant: Amazon Technologies, Inc., Seattle, WA (US)

(72) Inventors: Timothy Michael Vanderet, San Francisco, CA (US); Miguel Angel Morales, Mountain View, CA (US); Joshua Danel Lemons, San Jose, CA (US); Srivatsan Subbarayan, Sunnyvale, CA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 0 days.

(21) Appl. No.: 14/313,460

(22) Filed: Jun. 24, 2014

(51) Int. Cl.
*G06F 3/033* (2013.01)
*G06F 3/0354* (2013.01)

(52) U.S. Cl.
CPC .................................. *G06F 3/03545* (2013.01)

(58) Field of Classification Search
CPC .............................. G06F 3/033; G06F 3/03545
See application file for complete search history.

(56) References Cited

U.S. PATENT DOCUMENTS

| | | | | |
|---|---|---|---|---|
| 5,206,785 A * | 4/1993 | Hukashima | ............ | G01D 5/2417 361/283.2 |
| 5,290,972 A * | 3/1994 | Someya | .............. | G06F 3/03545 178/19.04 |
| 5,565,632 A * | 10/1996 | Ogawa | ................ | G06F 3/03545 73/862.041 |
| 5,576,502 A * | 11/1996 | Fukushima | ......... | G06F 3/03545 178/19.01 |
| 5,895,895 A * | 4/1999 | Ono | ..................... | G06F 3/03545 178/19.01 |
| 5,914,708 A * | 6/1999 | LaGrange | ........... | G06F 3/03545 178/18.06 |
| 7,511,705 B2 * | 3/2009 | Silk | ........................ | G06F 1/3203 345/179 |
| 8,184,109 B2 * | 5/2012 | Fukushima | ......... | G06F 3/03545 178/19.03 |
| 8,199,132 B1 * | 6/2012 | Oda | ..................... | G06F 3/03545 178/19.03 |
| 8,648,839 B2 * | 2/2014 | Liaw | ................... | G06F 3/03545 178/18.01 |
| 8,913,042 B2 * | 12/2014 | Mercea | ................... | G06F 3/033 345/179 |
| 8,978,487 B2 * | 3/2015 | Fergusson | ........... | G06F 3/03545 345/179 |
| 2001/0038384 A1 * | 11/2001 | Fukushima | ......... | G06F 4/03545 345/179 |
| 2002/0070927 A1 * | 6/2002 | Fujitsuka | ............. | G01D 5/2006 345/179 |
| 2003/0141119 A1 * | 7/2003 | Chao | ................... | G06F 3/03545 178/19.01 |
| 2009/0315864 A1 * | 12/2009 | Silverbrook | ........ | G06F 3/03545 345/179 |
| 2011/0219892 A1 * | 9/2011 | Fukushima | ......... | G06F 3/03545 73/865.4 |
| 2011/0298709 A1 * | 12/2011 | Vaganov | ............. | G06F 3/03546 345/158 |
| 2012/0253699 A1 * | 10/2012 | Kuno | ................... | G06F 3/03545 702/41 |
| 2013/0106794 A1 * | 5/2013 | Logan | ..................... | G06F 3/044 345/179 |
| 2013/0241897 A1 * | 9/2013 | Fukushima | ......... | G06F 3/03545 345/179 |
| 2013/0269446 A1 * | 10/2013 | Fukushima | .......... | G01B 5/0004 73/818 |
| 2014/0029156 A1 * | 1/2014 | Obata | ................. | G06F 3/03545 361/270 |
| 2014/0085270 A1 * | 3/2014 | Obata | ................. | G06F 3/03545 345/179 |
| 2014/0160088 A1 * | 6/2014 | Mercea | ................. | G06F 1/3259 345/179 |
| 2014/0267182 A1 * | 9/2014 | Fergusson | ........... | G06F 3/03545 345/179 |

\* cited by examiner

*Primary Examiner* — Joe H Cheng
(74) *Attorney, Agent, or Firm* — Seyfarth Shaw LLP; Ilan N. Barzilay; David A. Klein

(57) ABSTRACT

An electronic stylus device includes one or more mechanisms that deform to protected an electronic force sensor. After the mechanism deforms to relieve force applied to a tip of the stylus, a hard stop may engage to arrest further movement of a shaft transferring force from the tip to the force sensor. The intermediate range of forces that may be relieved by the mechanism, in addition to providing the electronic force sensor, enables less stringent manufacturing tolerances to be used with the hard stop.

20 Claims, 10 Drawing Sheets

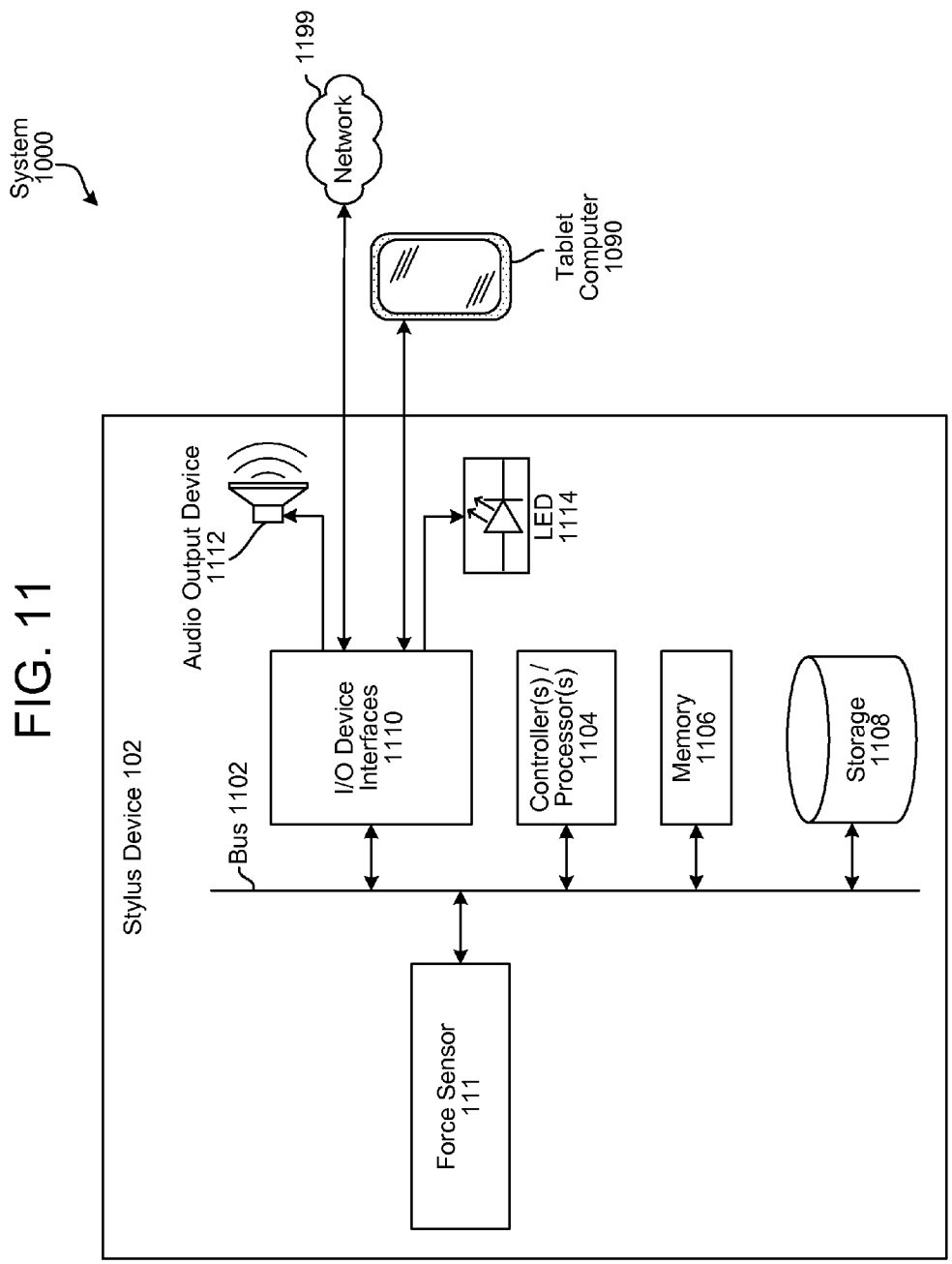

PROTECTING STYLUS FORCE SENSOR FROM EXCESS FORCE

BACKGROUND

With the advancement of technology, the use and popularity of electronic devices, such as mobile devices, has increased considerably. Mobile devices, such as smart phones and tablet computers, typically have touch screens that enable a user to operate the devices by touching the screen with a finger or stylus type device. Stylus devices can mimic the use of familiar writing tools, such as pens and pencils.

BRIEF DESCRIPTION OF DRAWINGS

For a more complete understanding of the present disclosure, reference is now made to the following description taken in conjunction with the accompanying drawings.

FIG. 11 is a block diagram conceptually illustrating example components of the stylus in the system of FIG. 10.

Figure 1:
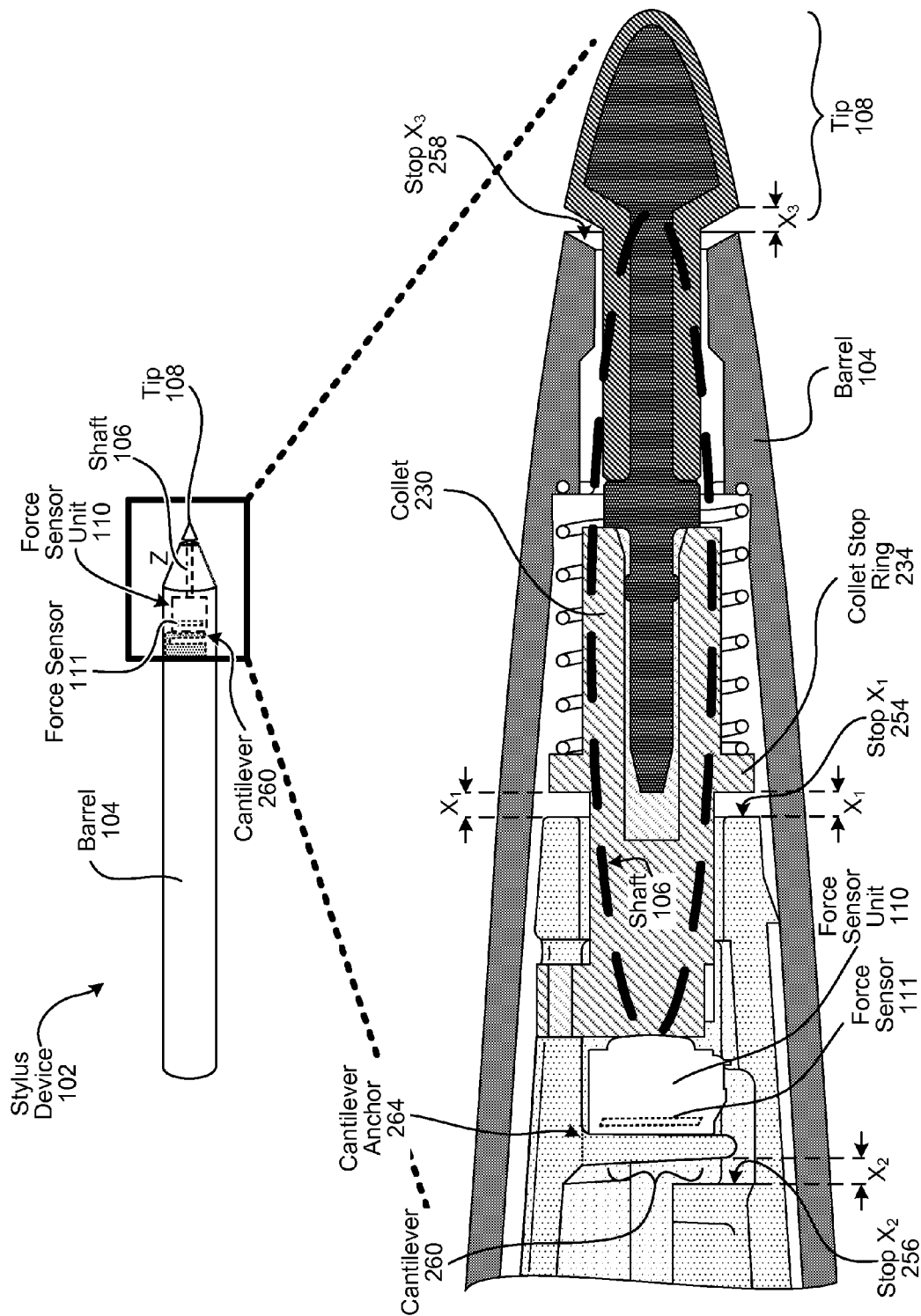
FIG. 1 illustrates is a stylus incorporating a mechanism to protect the stylus' force sensor by relieving excessive force applied to the tip.

The features in the drawings are not necessarily drawn to scale unless expressly stated otherwise.

DETAILED DESCRIPTION

The electronic force/pressure sensors used in styluses may be brittle. While they may tolerate some force in excess of those that they can measure, exceeding a force tolerance may cause irreparable harm to the sensor. While more robust sensors exist, they tend to be larger, may not be as sensitive as the brittle sensors, and/or can be substantially more expensive. To protect the sensor, one approach is to include a physical "stop" inside the stylus that prevents the components that transfer force from the tip to the sensor from moving beyond a certain point, thereby limiting the compressive force transferred to the sensor. While such "hard" stops may protect the sensor, forces in excess of the mechanical tolerances of the sensor may be transferred the writing surface/screen of the accompanying electronic tablet. Moreover, subtle difference in manufacturing tolerances can produce defective styluses if the hard stop prevents the sensor from measuring an upper range of measureable forces, or fails to prevent the application of excessive forces.

FIG. 1 illustrates an overview of a stylus device 102 incorporating one-or-more mechanisms that deform to protect the stylus' force sensor, relieving excessive force applied to the tip. As illustrated in the example in FIG. 1, the mechanism is a cantilever 260. The stylus device 102 includes a tip 108 extending out an end of a barrel housing 104. Among other components, the barrel 104 contains a shaft 106 and a force sensor unit 110. Force from the tip 108 is transferred to an electronic force sensor contained within the force sensor unit 110 via the shaft 106.

The one-or-more mechanisms incorporated by the stylus device 102 to protect the force sensor may be in front of the sensor (e.g., between the shaft 106 and the force sensor unit 110), may be behind the force sensor (e.g., behind force sensor unit 110), and/or may be built into the tip 108. As illustrated, the cantilever 260 is behind the force sensor unit 110.

Force transferred to the force sensor is converted into an electronic signal. This signal may be amplified and/or processed by circuitry in the stylus 102. As will be discussed below in connection with FIG. 10, data based on a magnitude of the applied force may be transmitted to a tablet computer via a communications link of the stylus.

If a stylus device does not include hard stops, impact events such as if the stylus is dropped tip-down result in forces greater than what the force sensor 111 can withstand. Hard stops built into the stylus to arrest movement of the shaft 106 are examples of static "alternative load paths." While a hard stop may protect a force sensor 111, it may not protect other devices. For example, if a stylus device includes hard stops to protect the force sensor, but no other mechanisms to relieve force, than excessive forces applied when writing on the display of a device are transferred to the physical display. In comparison, the mechanisms disclosed herein, such as the cantilever 260, protect the force sensor by relieving excessive force without transferring all of the excessive force, for example to the physical display. These dynamic alternative load paths flex or deform to provide displacement, thereby relieving the excessive force applied to the tip, within a certain range.

For example, if a force sensor unit 110 is designed to withstand forces from zero newtons to ten newtons, forces exceeding ten newtons (e.g., from ten to sixty newtons) may be relieved by a dynamic alternative load path. The force the electronic force sensor is configured to withstand may vary (e.g., up to a value in a range of ten to twenty newtons) depending upon manufacturer, with the dynamic alternative load path configured to relieve at least forces in excess of that upper limit. Hard stops such as stop $X_1$ (254) and stop $X_3$ (258) may be included to prevent forces exceeding the limits of the dynamic alternative load paths from impacting the force sensor, since those forces would otherwise be transferred to the force sensor unit 110. However, the intermediate force range created by the dynamic alternative load path(s), in addition to affording added impact protection for the stylus 102 (and the screen of the tablet computer 1090), accommodate less stringent manufacturing tolerances than designs that rely solely on hard stops.

In addition, by tuning the forces relieved by the dynamic alternative load path, a stylus design may accommodate force sensor modules with different tolerances (e.g., from different manufacturers) without requiring substantial reengineering. For example, a force sensor module designed for forces from zero to ten newtons may be paired with a dynamic alternative load path tuned to relieve from ten to fifty newtons, while another force sensor module designed for forces from zero to fifteen newtons may be paired with a dynamic alternative load path tuned to relieve the same ten to fifty newtons, or a dynamic alternative load path tuned to relieve from fifteen to sixty newtons. By virtue of such tuning, static "hard" stops do not need to be reengineered for the different sensor module tolerances.

Figure 2:
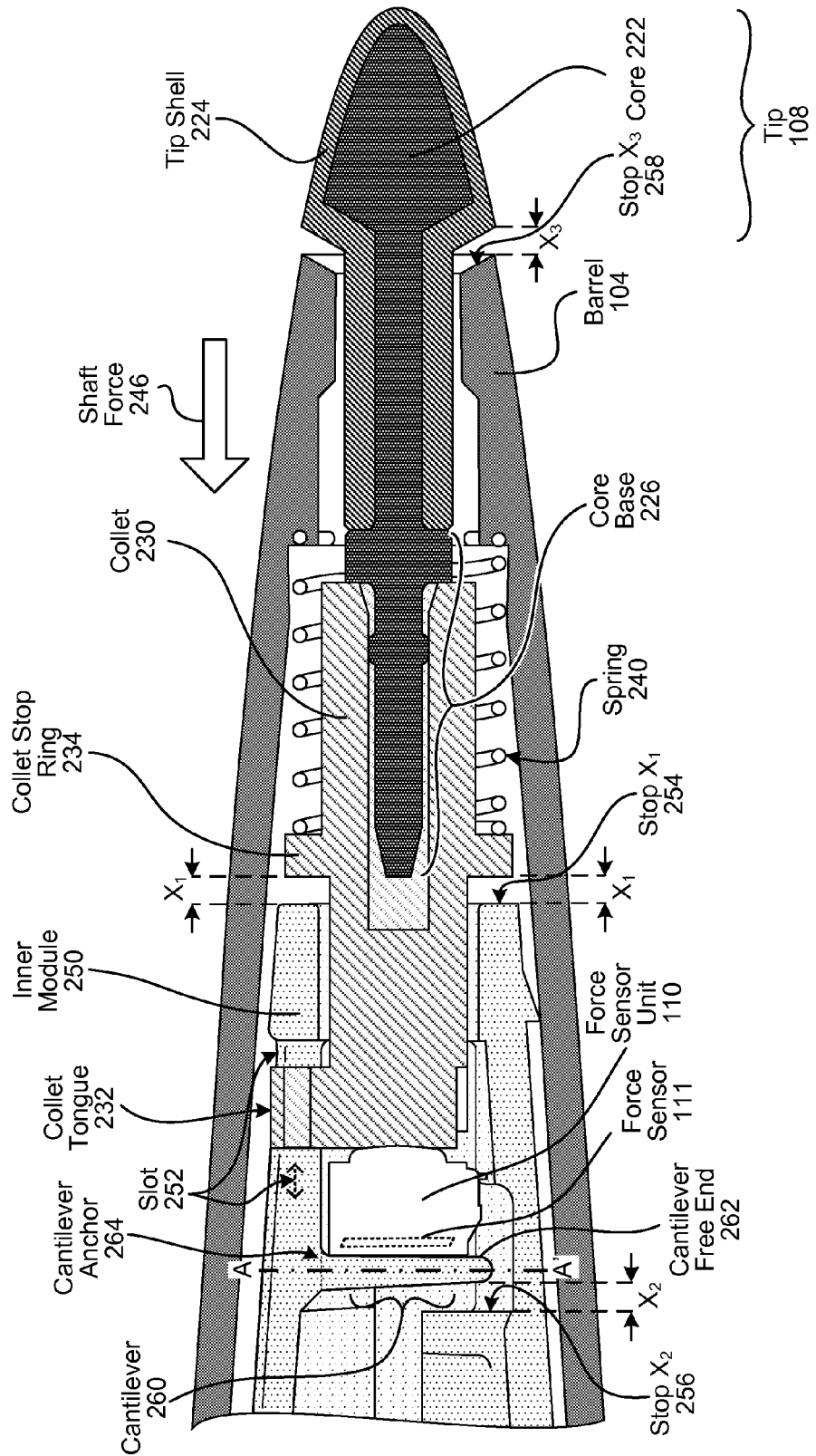
FIG. 2 illustrates a more detailed partial cross-section of the stylus in FIG. 1.

FIG. 2 illustrates a more detailed partial cross-section of an embodiment of the stylus device 102 incorporating the cantilever 260 to protect the stylus' force sensor 111 (within the force sensor unit 110, illustrated as a white outline in FIG. 2) by relieving excessive force applied to the tip 108. The cantilever 260 is positioned behind the force sensor unit 110, which comprises a force sensor 111 (not shown in later figures). One end of the cantilever 260 is anchored (264) to the inner module 250 (dotted pattern in FIG. 2) that contains the force sensor unit 110. The other end, free end 262, is unanchored, allowing the cantilever to bend at the anchor end (264) when a large force is applied to the cantilever. When force 246 is applied to the tip 108, the force is transferred by the shaft 106 to the force sensor unit 110. Excessive force is relieved by displacement of the cantilever 260 as it deforms to deflect backwards (i.e., in the same direction as the shaft force 246) so that the cantilever's free end 262 approaches stop $X_2$ 256.

As used herein, the "shaft" 106 does not refer to a particular structure, but rather, refers generally to the structure or structures that transfer force from the tip 108 to the force sensor unit 110 (or transfer force from the tip 108 to a dynamic alternative load path interposed between the shaft and the force sensor unit 110, as will be described further below). In the example in FIG. 2, the shaft comprises an axial portion of the tip core 222 behind the tip 108 and a collet 230 (light diagonal cross-hatching in FIG. 2). The illustrated tip 108 may be replaceable, having a base 226 that removably snaps or screws into the collet 230. In comparison, with a non-replaceable tip, the collet and tip core may be formed as a single monolithic component.

A spring 240 applies a small constant force to the force sensor via the collet 230. The force sensor unit 110 may be "floating" in the inner module 250 (i.e., not adhered or mounted, but loose and unattached), held in place (at least in part) by the force applied by the spring 240.

The tip 108 itself comprises a rigid core 222 and a shell 224. The rigid core 222 provides structure to the shaft 106 and tip 108. The rigid core may be electrically conductive and may be connected to electronics (not shown) to cause an electric field to emanate from the tip 108 that can be used by the tablet computer 1090 to determine a position of the stylus 102 when proximate to a surface of the touch screen 1092. The rigid core 222 may be, among other things, a metal. The tip shell 224 may be a resin molded over the core 222, such as a conductive polymer resin.

The tip shell 224 may be a soft polymer, a medium polymer, and/or a hard polymer, depending upon (among other things) the intended use of the stylus, preference of the user, and the material surface of the touch screen 1092. A hard polymer coating tends to have a sliding feel against the touch screen and erodes or wears slower than softer polymer coatings. A soft polymer coating tends to grip the touchscreen more than a hard polymer coating and, therefore, may erode or wear faster than a harder polymer coating. By using an electrically conductive polymer, the tip 108 may function as an electrode and can be used to electromagnetically transmit and receive information to and from the tablet computer 1090.

The collet 230 is formed of a material that does not readily deform such as metal. Examples of specific materials include copper and beryllium copper (also known as spring copper). The collet is "floating" within the barrel housing 104 (i.e., not adhered or mounted, but loose and unattached), but a range of its movement may be controlled by one or more slots or gaps 252 provided by an inner module 250. In FIG. 2, a tongue 232 is inserted into the slot 252 of the inner module, guiding the movement of the collet 230 back-and-forth in the slot 252 as force is applied to the tip 108.

The inner module 250 may also float within the barrel housing 104 (i.e., not adhered or mounted, but loose and unattached). The inner module 250 contains the force sensor unit 110. It may be constructed from a material with a large yield strength and large ductility such as, for example, unfilled polycarbonate.

The cantilever 260 may be formed of a pliable material having a large deformation yield strength and large modulus of elasticity. The cantilever 260 may be, among other things, deformable plastic or unfilled polycarbonate. The cantilever anchor 264 may be fastened to the inner module 250, or the cantilever 260 and inner module 250 may be formed as a single-piece monolithic structure (improving tolerances by reducing manufacturing variation). The cantilever 260 has little-to-no impact on the stylus during normal usage, but rather, primarily relieves excessive forces. The thickness of the cantilever 260 may be calculated by applying beam theory based on a maximum permissible deflections of the force sensor unit 110 and/or force sensor.

As illustrated in FIG. 2, the cantilever embodiment of the stylus device includes two hard stops. A first hard stop is stop $X_1$ (254). From an unloaded tip position, the shaft 106 may travel back a distance of $X_1$ before a stop ring 234 of the collet comes into contact with a front edge of the inner module 250, arresting motion of the collet 230 relative to the force sensor.

A second hard stop is the stop $X_2$ 256, comprising a surface of the inner module 250 behind the cantilever beam 262 which impedes further rearward displacement of the cantilever free end 262. The distance $X_2$ may be larger than the distance $X_1$. By setting the distance $X_2$ to be larger than $X_1$, the stop $X_1$ (254) engages before the cantilever free end 262 reaches its maximum deflection/displacement ($X_2$ being engineered to accommodate manufacturing tolerances).

Depending upon the shape of the tip, another potential hard stop may be provided by the back of the tip 108, illustrated as hard stop $X_3$ 258. If the tip flares outward from the longitudinal axis (as illustrated), the displacement of the rear surface of the tip 108 may be limited by where it will impact with the front of the barrel 104, arresting further movement of the shaft 106. The stop distance $X_2$ of the cantilever 260 may also be larger than the distance $X_3$ between the back of the tip 108 (accounting for compression of tip shell 224 at the $X_3$ interface) and the front of the barrel 104, such that tip 108 travel is interrupted before the cantilever 260 reaches its displacement limit.

If multiple dynamic alternative load paths are included, such that more than one displaceable structure relieves excessive forces before a hard stop is engaged, then the distance $X_2$ may be smaller than the distance $X_1$ and $X_3$, with a sum of the displacement limits of the dynamic alternative load paths exceeding the hard stop distance $X_1$ and $X_3$.

Figure 3:
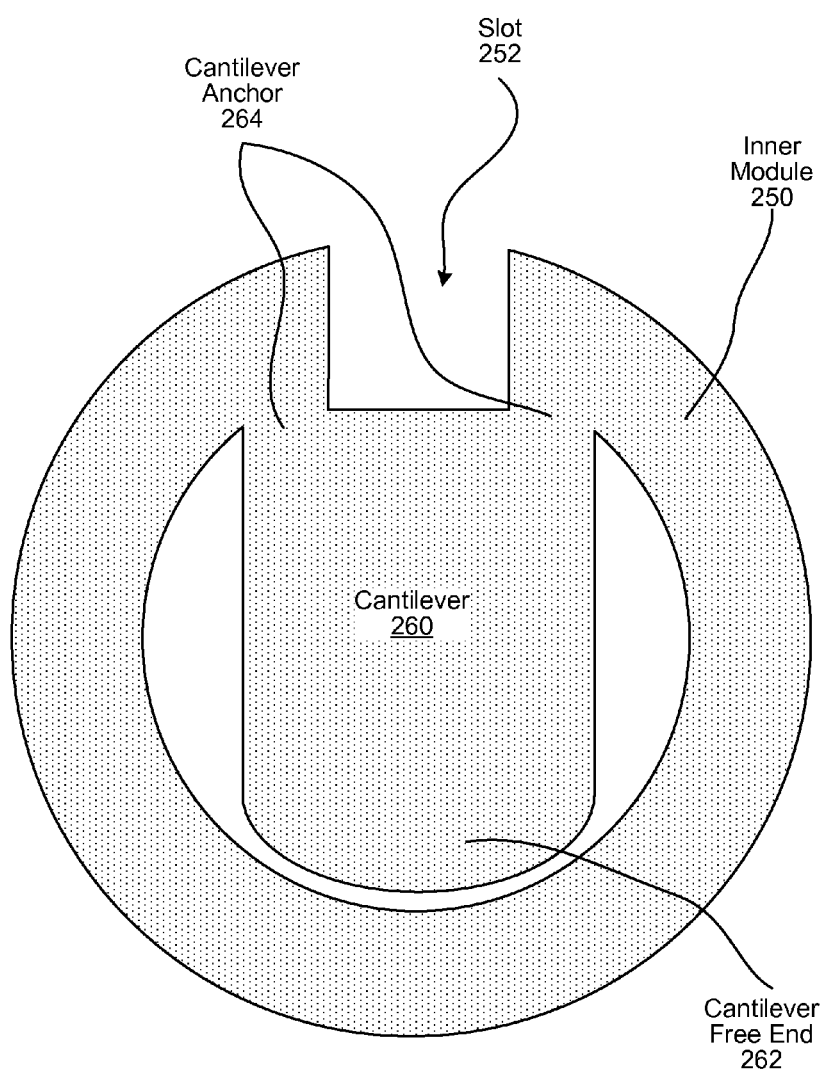
FIG. 3 is a cross-section of the inner module and cantilever along lines A-A' in FIG. 2.

FIG. 3 illustrates a cross-section of the inner module 250 and cantilever 260 along line A-A' in FIG. 2. Although the tongue 232 of the collet may not travel as far back as the cantilever 260, as illustrated in FIG. 2, the slot 252 may extend back to the cantilever 260.

Figure 4:
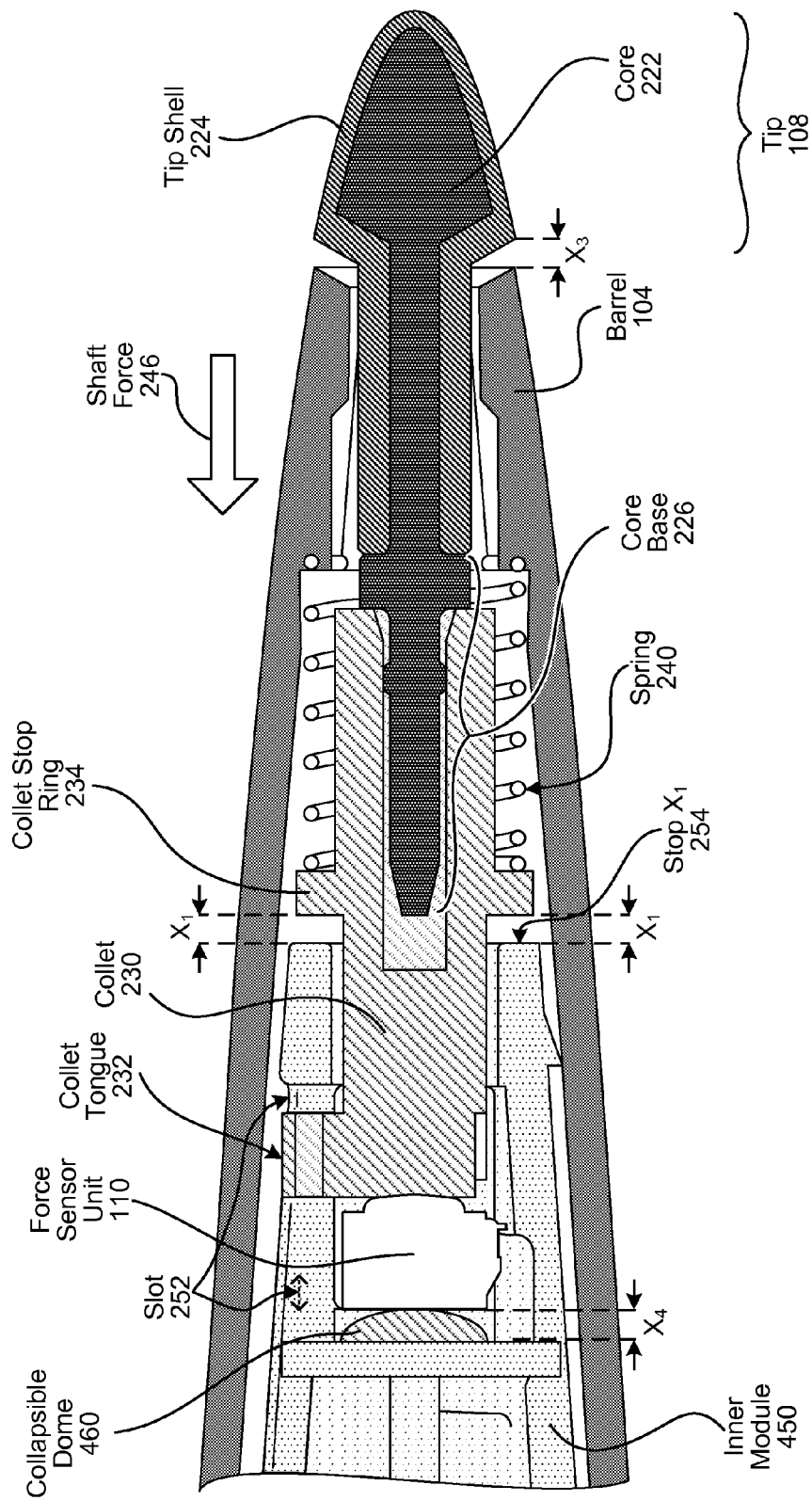
FIG. 4 illustrates a partial cross-section of a stylus incorporating a collapsible dome to protect the stylus' force sensor by relieving excessive force applied to the tip.

FIG. 4 illustrates a partial cross-section of an embodiment of the stylus device 102 incorporating a collapsible dome 460 to protect the stylus' force sensor (located within the force sensor unit 110) by relieving excessive force applied to the tip 108. The collapsible dome 460, which in FIG. 4 is positioned behind the force sensor unit 110, remains rigid until a threshold force is applied, at which point the dome deforms and collapses. The dome 460 may be adhered to the inner module 450, simplifying assembly (in comparison to floating). For example, if the force sensor unit 110 is designed to withstand forces from zero to ten newtons, the collapsible dome 460 may be set to collapse after the shaft force 246 reaches or exceeds ten newtons. The collapse of the dome 460 may be abrupt, going from fully expanded to it collapse distance $X_4$, or most of its collapse distance (e.g., 95%), as the force exceeds a threshold. In other words, the collapsible dome 460 does not operate like a spring that compresses slowly as force is applied, but rather, snaps abruptly from fully extended to almost entirely collapsed. The dome 460 may be constructed in the same manner as a dome used with dome-switch keyboards, such as a stainless steel dome.

The collapse of the dome 460 may cause a hard stop such as stop $X_1$ (254) to engage. Engaging a hard stop in this manner allows for more robust structural manufacturing tolerances. For example, instead of requiring tolerances on the order of microns in a stylus that employs only static hard stops, the added displacement provided by the dome 460 may accommodate tolerances of millimeters. This benefit is also true of the cantilever 260, but the dome 460 may fully displace in response to a narrower range of forces.

The difference between the uncollapsed and collapsed dome ($X_4$) may be larger than the distance $X_1$ of the stop $X_1$ (254), such that the stop $X_1$ engages before the excessive force is applied to the force sensor unit 110. Likewise, if a flared tip 108 provides a hard stop against the front of the barrel, the maximum displacement of the collapsible dome 460 (distance $X_4$) may larger than the displacement of the tip (distance $X_3$). However, if multiple dynamic alternative load paths are included, such that more than one displaceable structure relieves excessive forces before a hard stop is engaged, then the distance $X_4$ may be smaller than the distance $X_1$ and $X_3$, with the sum of the displacement limits of the dynamic alternative load paths exceeding the hard stop distance $X_1$ and $X_3$.

Although the collapsible dome 460 is illustrated in FIG. 4 behind the force sensor unit 110, the collapsible dome may instead be positioned in front of the force sensor, between the core base 226 and the force sensor 110 (e.g., at the rear of the collet 230). The collapsible dome 460 may be combined with other displacement mechanisms such as the cantilever 260. For example, the cantilever 260 may relieve excess stresses from ten to sixty newtons, with the dome 460 collapsing at forces exceeding sixty newtons.

Figure 5:
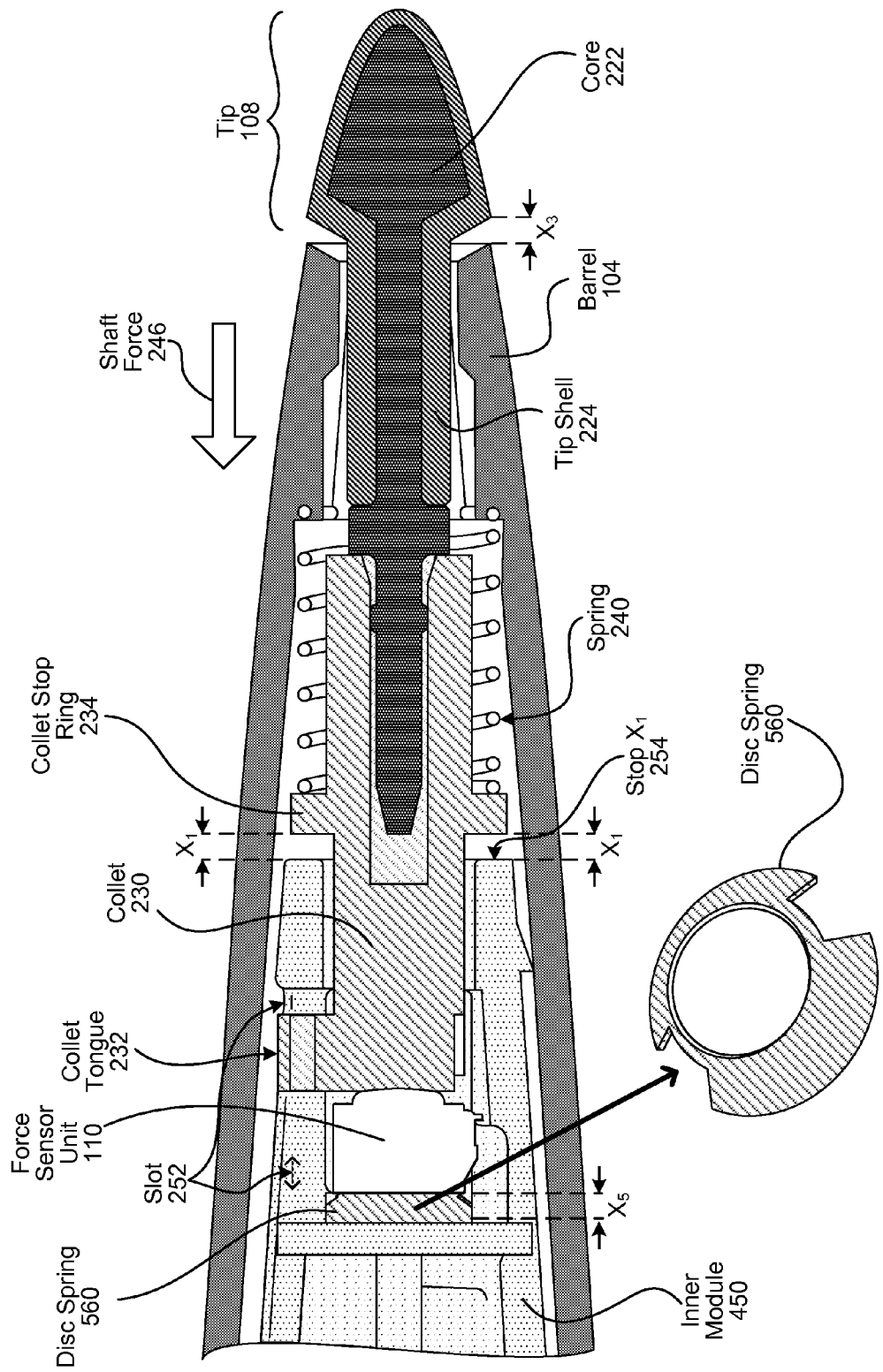
FIG. 5 illustrates a partial cross-section of a stylus incorporating a disc spring to protect the stylus' force sensor by relieving excessive force applied to the tip.

FIG. 5 illustrates a partial cross-section of an embodiment of the stylus device 102 incorporating a disc spring 560 to protect the stylus' force sensor (not shown; inside force sensor unit 110) by relieving excessive force applied to the tip 108. Similar to the collapsible dome 460, the disc spring 560 is configured to deform to transfer force to a static load path such as stop $X_1$ (254), except the disc spring 560 collapses gradually with increasing force (rather than abruptly as describe with the collapsible dome 460). For example, if the force sensor unit 110 tolerates displacements of the shaft 106 corresponding to shaft forces (246) from zero to ten newtons, then the disc spring 560 may be configured to deform sufficiently at forces exceeding ten newtons so as to engage a structural hard stop (e.g., stop $X_1$ 254). The disc spring 560 may be engineered to have a large stiffness and to have relatively small dimensions. An example material for the disc spring 560 is spring steel, which is a low alloy, medium-carbon or high-carbon steel with very high yield strength. The compression characteristics of the disc spring 560 may be tuned to be linear or non-linear, and multiple disc springs 560 may be stacked to optimize stiffness.

The difference between the uncompressed and compressed disc spring (distance $X_5$) may be larger than the distance $X_1$ of the hard stop $X_1$ (254), such that the hard stop $X_1$ engages before the excessive force is applied to the force sensor. Likewise, if a flared tip 108 provides a hard stop against the front of the barrel, the potential displacement of the disc spring 560 (distance $X_5$) may be larger than the displacement of the tip (distance $X_3$). However, if multiple dynamic alternative load paths are included, such that more than one displaceable structure relieves excessive forces before a hard stop is engaged, then the distance $X_5$ may be smaller than the distance $X_1$ and $X_3$, with the sum of the displacement limits of the dynamic alternative load paths exceeding the hard stop distance $X_1$ and $X_3$.

Although the disc spring 560 is illustrated in FIG. 5 behind the force sensor unit 110, the disc spring 560 may instead be positioned in front of the force sensor unit 110, between the core base 226 and the force sensor unit 110 (e.g., at the rear of the collet 230). The disc spring 560 may also be combined with other displacement mechanisms such as the cantilever 260. For example, the cantilever 260 may relieve excess stresses from ten to fifty newtons, with the disc spring 560 providing supplemental displacement for even larger forces (e.g., relieving forces exceeding fifty newtons up to sixty newtons, although the lower limit of the disc spring 560 may be less than the upper limit of the cantilever 260 to improve manufacturing tolerances).

Figure 6:
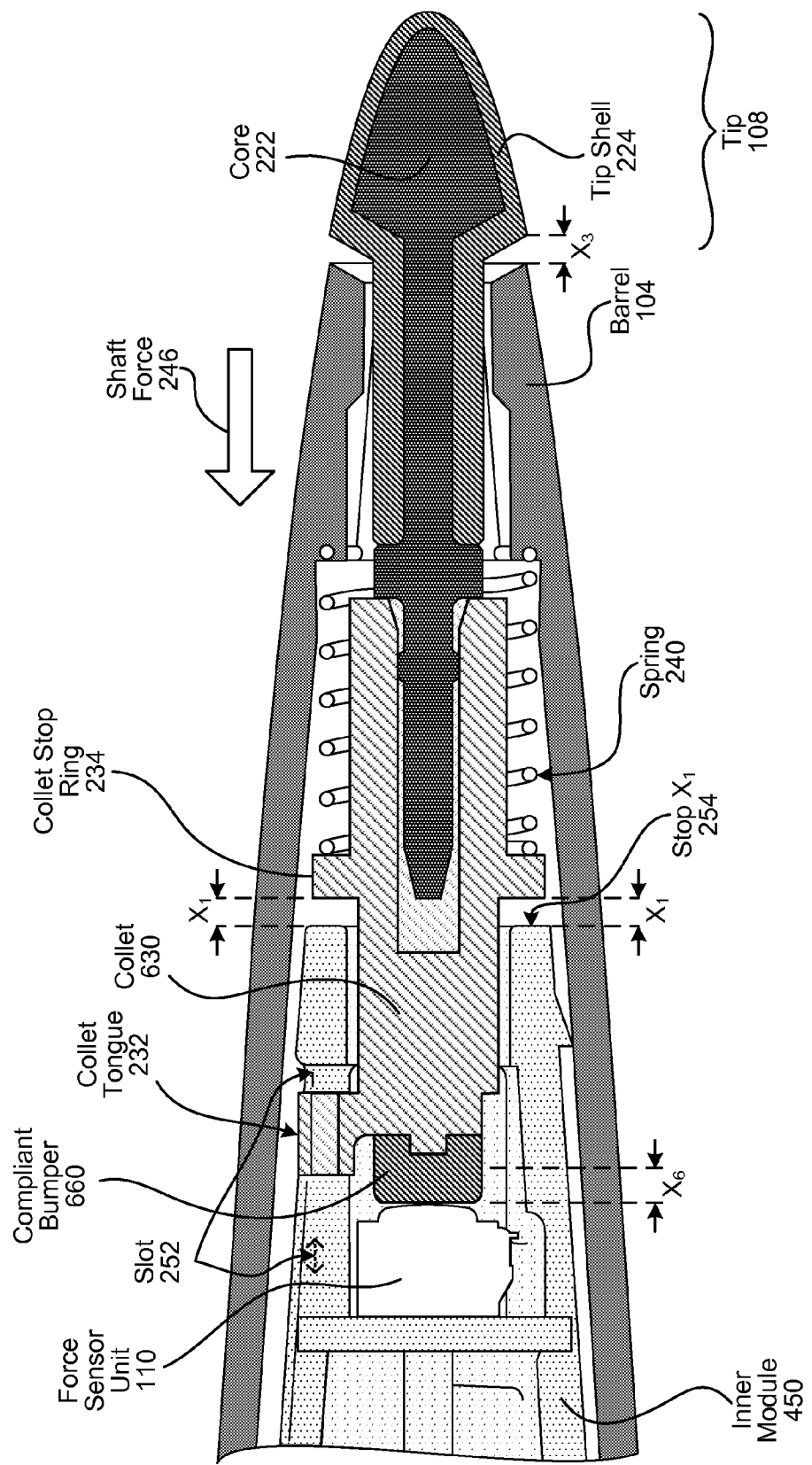
FIG. 6 illustrates a partial cross-section of a stylus incorporating a compliant bumper to protect the stylus' force sensor by relieving excessive force applied to the tip.

FIG. 6 illustrates a partial cross-section of an embodiment of the stylus device 102 incorporating a compliant bumper 660 that deforms to protect the stylus' force sensor by relieving excessive force applied to the tip 108. As illustrated, the bumper is positioned between the collet 630 and the force sensor unit 110. An example of a material that may be used as the bumper is silicone rubber, or a similar complaint material. The compliant material preferably has a Shore hardness of at least forty-eight (e.g., silicone rubber with a Shore hardness of forty to sixty).

Compression of the bumper 660 may be used to engage a hard stop. For example, the compliant material of the bumper 660 may act as a spring opposing shaft forces 246 from zero to ten newtons, with that force transferred through the bumper 660 from the shaft 106 to the force sensor unit 110. At ten newtons or higher, compression of the bumper 660 results in the engagement of a hard stop, such as hard stop $X_1$ (254). The collet 630 is similar to collet 260, but modified to accommodate the position of the bumper 660 in front of the force sensor unit 110.

The difference between the uncompressed and compressed bumper 660 (distance $X_6$) may be larger than the distance $X_1$ at which the collet stop ring 234 engages the hard stop $X_1$ (254), such that the stop $X_1$ engages before the excessive force is applied to the force sensor. Likewise, if a flared tip 108 provides a hard stop against the front of the barrel, the maximum displacement of the bumper 660 (distance $X_6$) may be larger than the displacement of the tip (distance $X_3$). However, if multiple dynamic alternative load paths are included, such that more than one displaceable structure relieves excessive forces before a hard stop is engaged, then the distance $X_6$ may be smaller than the distance $X_1$ and $X_3$, with the sum of the displacement limits of the dynamic alternative load paths exceeding the hard stop distance $X_1$ and $X_3$.

Although the bumper 660 is illustrated in FIG. 6 in front of the force sensor unit 110, between the force sensor unit 110 and the shaft 106, bumper 660 may instead be positioned behind the force sensor unit 110. The bumper 660 be combined with other displacement mechanisms, with the cumulative force causing engagement of a hard stop.

Figure 7:
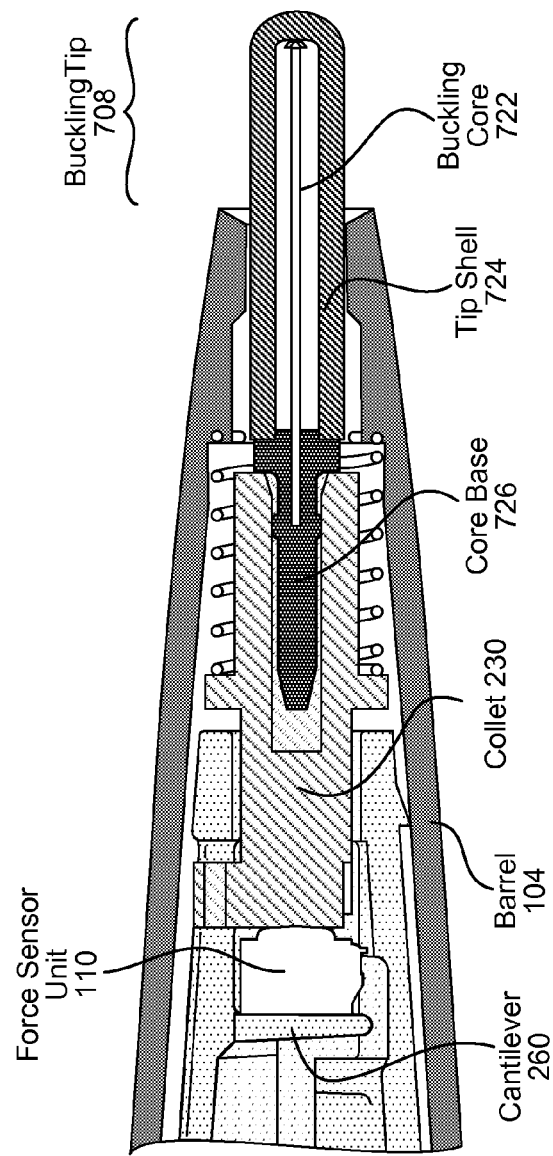

FIG. 7 illustrates a variation on the cantilever embodiment in FIG. 2, modified to include a buckling tip 708. Buckling of the tip 708 is triggered by an applied force exceeding a threshold, such as a force exceeding the absorption limits of the force sensor unit 110 and/or the dynamic alternative load path(s). The threshold at which the buckling core 722 will deform is set by modifying a diameter of the tip (for any particular material) and operates in a manner similar to crumple zones in automobiles. The buckling core 722 may be composed of a ductile metal with a low modulus of elasticity such as high beryllium copper. High beryllium copper is more pliable and less stiff than pure copper or pure steel. The buckling core 722 may have sufficient plasticity so that it will recover from deformation, or may be configured to break (requiring replacement).

Other than the change in tip, the embodiment illustrated in FIG. 7 is identical to the cantilever design in FIG. 2. The buckling core 722 may be fastened to a core base 726 that snaps or screws into the collet 230 (as described with core base 226). The tip shell 724 may be constructed with the same or similar materials and hardnesses as those described for tip shell 224.

Figure 8:
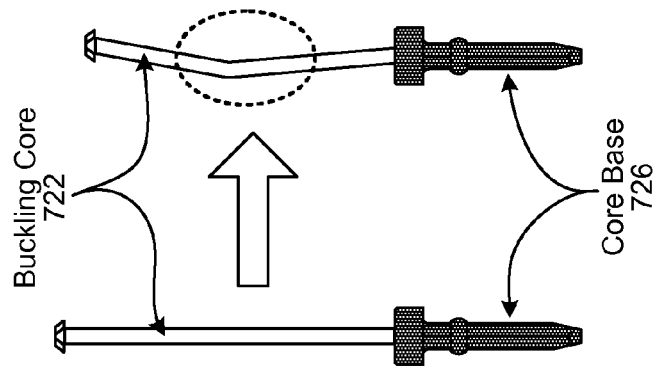
FIGS. 7 to 9 illustrate a buckling tip and partial cross-sections of styluses incorporating the buckling tip to protect the styluses' force sensors by relieving excessive force applied to the tip.
Figure 9:
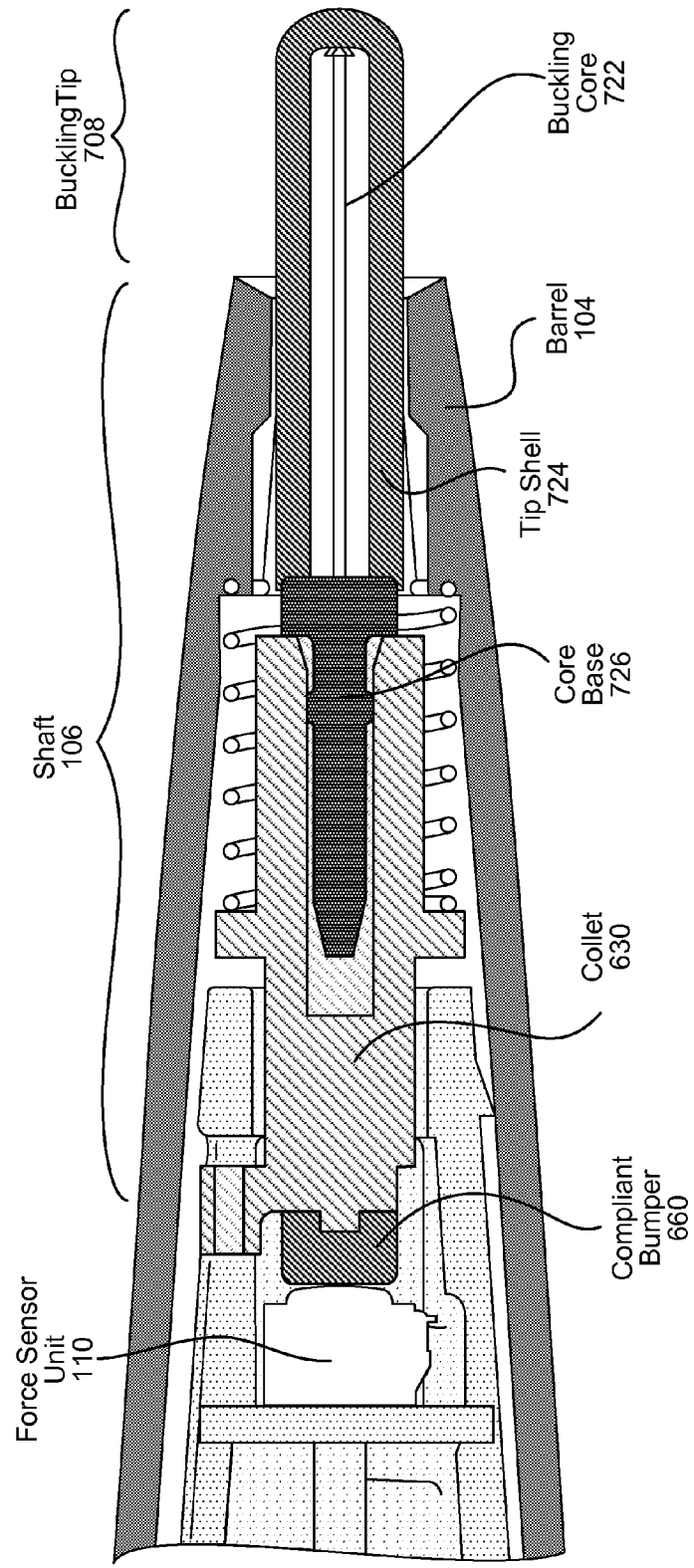

FIG. 8 illustrates a buckled and an unbuckled core 722 of the buckling tip 708, mounted on the core base 726. FIG. 9 illustrates a variation of the complaint bumper embodiment in FIG. 6, modified to include the buckling tip 708. The buckling tip 708 may be used with styluses employing any of the disclosed dynamic alternative load paths, with styluses employing combinations of the dynamic alternative load paths, with styluses including hard stops (static alternative load paths) but no dynamic alternative load paths, and with styluses where an entirety of the shaft force 246 is transferred to the force sensor unit 110 (i.e., a stylus with no hard stops and no dynamic alternative load paths, where an entirety of the force received by the tip is transferred to the force sensor but—for the relief provided by the buckling tip).

Figure 10:
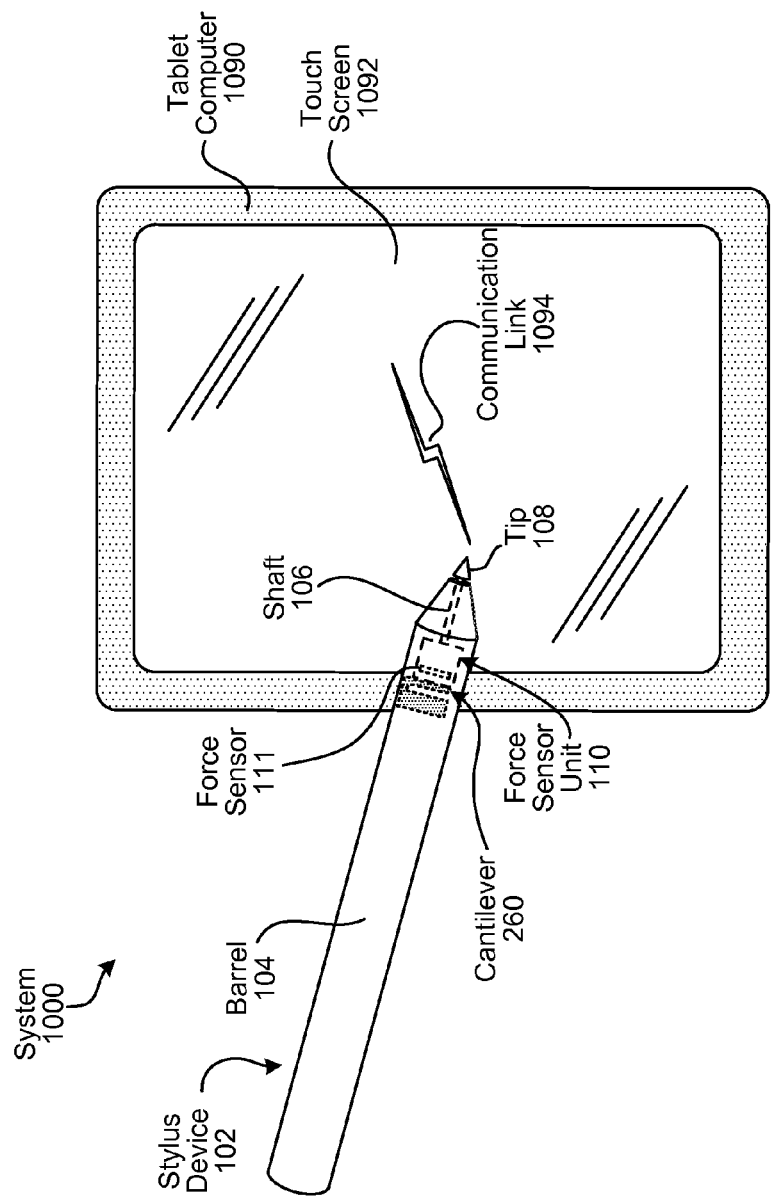
FIG. 10 illustrates is a system overview of a tablet computer with a stylus incorporating a mechanism to protect the stylus' force sensor by relieving excessive force applied to the tip.

FIG. 10 illustrates an overview of a system 1000 including a tablet computer 1090 with a stylus device 102 incorporating one-or-more mechanisms that deform to protect the stylus' force sensor, relieving excessive force applied to the tip. As illustrated, the mechanism is cantilever 260, although one-or-more of the other mechanisms described in connection with FIGS. 4 to 9 may be used instead, or together with the cantilever 260. As described, these mechanisms may be in front of the sensor (e.g., between the shaft 106 and the force sensor unit 110), may be behind the force sensor (e.g., behind force sensor unit 110), and/or may be built into the tip 108. The tablet computer 1090 may include a touch screen 1092. The stylus device 102 includes a tip 108 extending out an end of the barrel housing 104. Among other components, the barrel 104 contains a shaft 106 and a force sensor unit 110. Force from the tip 108 is transferred to an electronic force sensor contained within the force sensor unit 110 via the shaft 106.

Force transferred to the force sensor is converted into an electronic signal. This signal may be amplified and/or processed by circuitry in the stylus 102. Data based on a magnitude of the applied force may be transmitted to the tablet computer 1090 via a communications link 1094. The communications link may be of any technology used to pair styluses with tablets, including a radio link using a protocol such as Bluetooth, a capacitive link using electromagnetic signaling between a conductive core in the tip 108 and a touch screen 1092 of the tablet, etc. An electric field emitted by a tip 108 of the stylus 102 may be used by the tablet computer 1090 to determine a position of the tip 108 relative to the surface of the touch screen 1092. A modulation of the electric field emitted from the tip may also serve as the communications link 1094.

FIG. 11 is a block diagram conceptually illustrating example components of the stylus device 102 as discussed above in connection with FIGS. 1, 2, 4, 5, 6, 7, 9, and 10. In operation, the stylus device 102 may include computer-readable and computer-executable instructions that reside on the stylus device 102, as will be discussed further below.

As illustrated in FIG. 11, the stylus device 102 may include an address/data bus 1102 for conveying data among components of the stylus device 102. Each component within the stylus device 102 may also be directly connected to other components in addition to (or instead of) being connected to other components across the bus 1102.

The stylus device 102 may include one or more microcontrollers/controllers/processors 1104 that may each include a central processing unit (CPU) for processing data and computer-readable instructions, and a memory 1106 for storing data and instructions. The memory 1106 may include volatile and/or non-volatile random access memory (RAM), and/or other types of memory. The stylus device 102 may also include a data storage component 1108, for storing data and microcontrollers/controller/processor-executable instructions (e.g., instructions to determine a shaft force 246 received by the force sensor, and instructions to transmit a representation of the received force to another device such as the tablet computer 1090). The data storage component 1108 may include one or more non-volatile solid-state storage types such as Flash memory, read only memory (ROM), magneto-resistive RAM (MRAM), etc.

The stylus device 102 includes input/output device interfaces 1110. A variety of components may be connected through the input/output device interfaces 1110, such as an audio output device for producing sound (e.g., speaker 1112), a light emitting diode (LED) 1114, and/or other components, such as a display, an audio capture device/microphone, buttons/switches, etc. The speaker 1114, the LED 1114, and other components may be integrated into the stylus device 102 or may be separate.

The input/output device interfaces 1110 may also include an interface for an external peripheral device connection such as universal serial bus (USB), FireWire, Thunderbolt or other connection protocol. The input/output device interfaces 1110 may also include a connection to one or more wireless networks 1199, such as a wireless local area network (WLAN) radio (e.g., WiFi), Bluetooth, and/or wireless network radio. The stylus device 102 may connect to the computing device 1090 via one of these connections. Additionally or alternatively, the stylus device 102 and the computing device 1090 may communicate using electromagnetic communications via the tip 108/708 (for example, communicating by electric fields generated by each device to transmit data on a carrier frequency).

The stylus device 102 further includes a force sensor 111, which is contained within force sensor unit 110. As described above, the force sensor 111 may measure an amount of force applied to the tip (108, 708) of the stylus device 102, and may be for example, an optical force sensor, a capacitive force sensor, a piezoelectric sensor, a piezoelectric resistive sensor, or other sensor capable of measuring compressive force.

Force ranges and displacement limits of the dynamic load paths may be tuned. Specific force ranges may be set by choice of materials (e.g., stiffness, elasticity), and the size, dimensions, and shape of the dynamic structures (260, 460, 560, 660, and 722).

Instructions for operating the stylus device 102 and its various components may be executed by the microcontroller(s)/controller(s)/processor(s) 1104, using the memory 1106 as temporary "working" storage at runtime. The instructions may be stored in a non-transitory manner in non-volatile memory 1106, storage 1108, or an external device.

Alternatively, some or all of the executable instructions to capture and transmit the force received by the force sensor 111, and/or conversion of that force into processed data may be embedded in hardware or firmware in addition to or instead of software. For example, an application specific integrated circuit (ASIC) may receive data from the force sensor 111 and transmit that data (or a processed version) to the tablet computer 190.

Although the system 1000 in FIGS. 10 and 11 and the discussion above describe the device 1090 as being a tablet computer, any electronic device that can interact with the stylus 102 may be used as device 1090. Also, the writing surface of the device 1090 may or may not be a display, and may or may not be touch sensitive. If the writing surface of the device 1090 is touch sensitive (e.g., touch screen 1092), it may be of any technology, including capacitive, resistive, optical, etc.

The concepts disclosed herein may be applied within a number of different devices and computer systems, including, for example, general-purpose computing systems, multimedia devices, tablet computers, smart telephones, wearable electronic devices (watches, glasses, etc.), laptop computers, personal digital assistants (PDAs), displayless electronic writing surfaces, interactive tables, etc.

The examples of the stylus device 102 presented above are meant to be illustrative. They were chosen to explain the principles and application of the disclosure and are not intended to be exhaustive or to limit the disclosure. Many modifications, variations, and combinations of the disclosed embodiments of the stylus device 102 may be apparent to those of skill in the art. Persons having ordinary skill in the field of handwriting computer interfaces, tablet computers, PDAs, styluses, and force sensors should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

As used in this disclosure, the term "a" or "one" may include one or more items unless specifically stated otherwise. Further, the phrase "based on" is intended to mean "based at least in part on" unless specifically stated otherwise.

What is claimed is:

1. A stylus device, comprising:
a barrel housing;
a tip protruding from an end opening in the barrel housing, an axial portion of a rigid core of the tip extending behind the tip into the barrel housing through the end opening;
a collet receiving the axial portion of the rigid core of the tip within the barrel housing, the collet and the tip configured to move together when a force is applied to the tip, a stop surface protruding from a side of the collet;
an electronic force sensor proximate to an end of the collet opposite from the tip, configured to receive the force applied to the tip;
a cantilever, the electronic force sensor disposed between the collet and a beam of the cantilever, the cantilever configured to deflect, allowing the electronic force sensor to move, so as to relieve the force applied to the electronic force sensor; and
an inner module within the barrel housing including the cantilever and the electronic force sensor, the end of the collet inserted into the inner module,
wherein a surface of the inner module opposed to the stop surface of the collet is arranged to arrest movement of the collet relative to the electronic force sensor and the cantilever prior to the beam of the cantilever reaching a maximum deflection.

2. The stylus device of claim 1, wherein the tip comprises the rigid core and an outer shell, the rigid core comprising a metal and configured to buckle if the force applied to the tip exceeds a limit.

3. A stylus, comprising:
a housing;
a tip extending from an end of the housing;
an electronic force sensor disposed in the housing;
a shaft coupled to the tip and the electronic force sensor, the shaft configured to transfer a force received at the tip to the electronic force sensor; and
a cantilever, the electronic force sensor disposed between the shaft and the cantilever, the cantilever configured to deflect, allowing the electronic force sensor to move, so as to relieve the force received at the tip and transferred to the electronic force sensor.

4. The stylus of claim 3, wherein:
the electronic force sensor is configured to withstand the force up to a first threshold, a deflection of the cantilever to relieves a portion of the force that exceeds the first threshold.

5. The stylus of claim 4, further comprising:
a stop interface that arrests movement of the shaft prior to an unanchored end of the cantilever reaching a maximum deflection.

6. The stylus of claim 5, wherein the stop interface engages after the force exceeds a second threshold between ten and sixty newtons, the second threshold being greater than the first threshold.

7. The stylus of claim 5, wherein:
the top comprises a rigid core, an axial portion of the rigid core of the tip extending behind the tip into the housing through the end of the housing;
a collet receiving the axial portion of the rigid core within the housing, the collet and the tip configured to move together as parts of the shaft when the force is applied to the tip, with an end of the collet opposite from the tip being coupled to the electronic force sensor, a stop surface protruding from a side of the collet; and
an inner module within the housing including the cantilever and the electronic force sensor, the end of the collet inserted into the inner module,
wherein the stop interface comprises a first surface of the inner module, arresting movement of the shaft when the stop surface of the collet comes into contact with the first surface.

8. The stylus of claim 7, wherein the inner module and the cantilever are formed as a single monolithic component.

9. The stylus of claim 5, wherein maximum deflection of an unanchored end of the cantilever corresponds to a deflection where further movement of the unanchored end is obstructed, a difference between the maximum deflection and the unanchored end of the cantilever being greater than a distance the force moves the shaft before the stop interface engages.

10. The stylus of claim 5, wherein a back of the tip is wider than a portion of the shaft coupled to the back of the tip and is wider than an opening of the housing through which the shaft extends out to the tip, the stop interface comprising a surface of the housing around the opening, arresting movement of the shaft when the back of the tip comes into contact with the surface.

11. The stylus of claim 4, wherein the tip comprises a core and an outer shell, the core configured to buckle if the force applied to the tip exceeds a second threshold greater than the first threshold.

12. The stylus of claim 11, wherein the cantilever is configured to receive the force up to a third threshold greater than the first threshold, and the second threshold at which the core buckles is greater than the third threshold.

13. The stylus of claim 12, further comprising:
a stop interface that arrests movement of the shaft prior to an unanchored end of the cantilever reaching a maximum deflection, wherein the stop interface is configured to arrest movement if the force applied exceeds the third threshold.

14. A stylus device, comprising:
a housing;
a tip at an end of a shaft, the shaft extending from an opening in the housing;
an electronic force sensor, able to tolerate forces up to a first limit, the shaft configured to translate force received at the tip to the electronic force sensor;
means for relieving a portion of the force received at the tip that exceeds the first limit; and
means for arresting movement of the shaft after the force exceeds the first limit.

15. The stylus device of claim 14, where the means for relieving is disposed between the electronic force sensor and the shaft.

16. The stylus device of claim 15, wherein the means for relieving is a compliant bumper with a Shore hardness of forty to sixty.

17. The stylus device of claim 16, where the electronic force sensor is disposed between the means for relieving and the shaft.

18. The stylus device of claim 17, wherein the means for relieving is selected from the group consisting of a cantilever, a collapsible dome, and a disc spring.

19. The stylus device of claim 16, where at least a portion of the means for relieving is disposed in the tip.

20. The stylus device of claim 19, the tip comprising an outer shell containing the means for relieving disposed in the tip, wherein the means for relieving comprises a metal core configured to buckle if the force applied to the tip exceeds the first limit.

* * * * *